Figure 1:
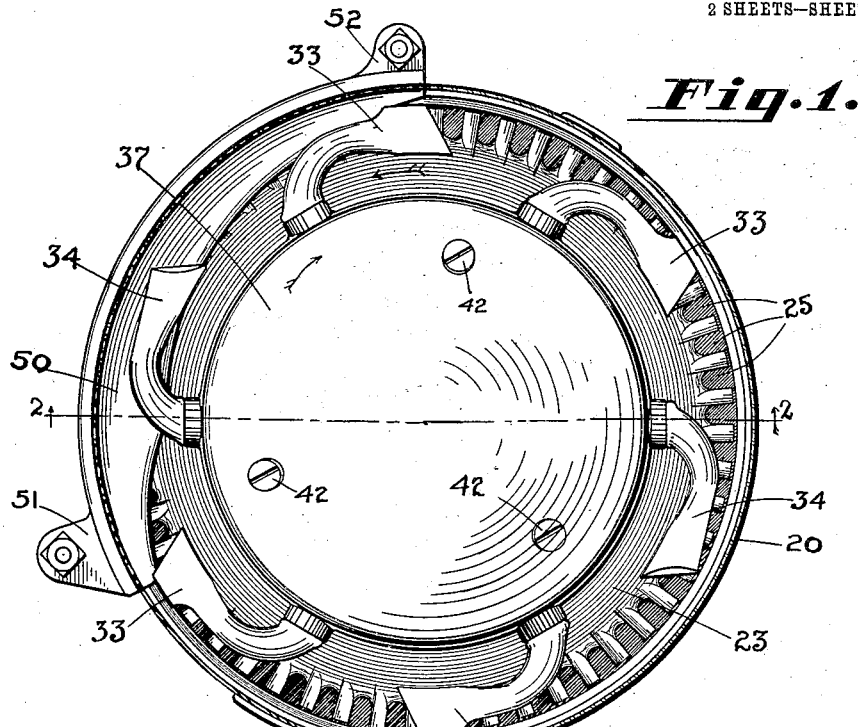

W. S. GRAHAM.
COTTON SEED DROPPING MECHANISM.
APPLICATION FILED JUNE 19, 1911.

1,017,664.

Patented Feb. 20, 1912.
2 SHEETS—SHEET 1.

W. S. GRAHAM.
COTTON SEED DROPPING MECHANISM.
APPLICATION FILED JUNE 19, 1911.
1,017,664.
Patented Feb. 20, 1912.
2 SHEETS—SHEET 2.
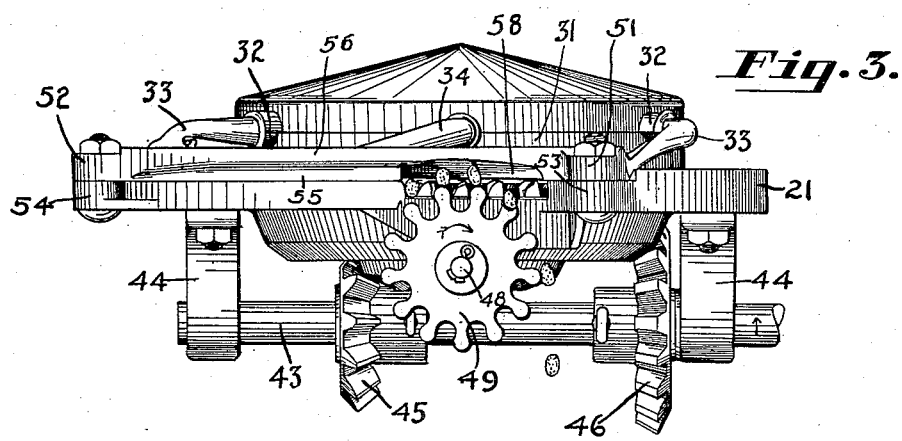
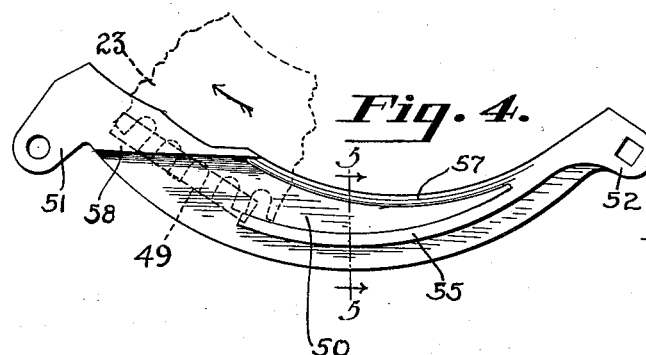
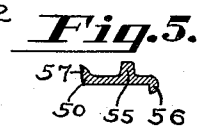
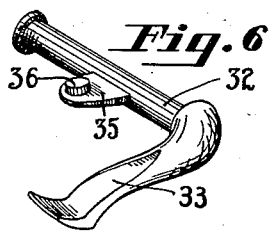
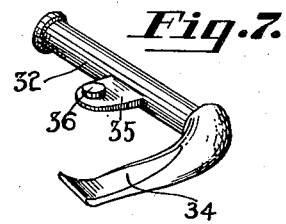
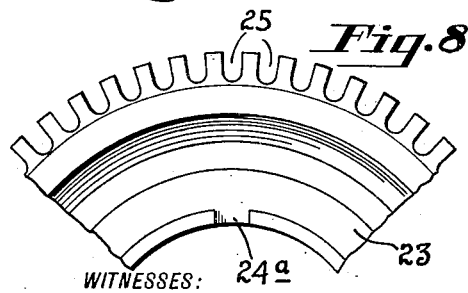
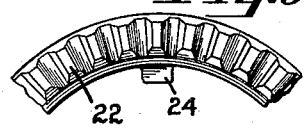
WITNESSES:
INVENTOR
William S. Graham
By Bond, Adams, Pickard Jackson
his ATTORNEYS
COLUMBIA PLANOGRAPH CO., WASHINGTON, D. C.

UNITED STATES PATENT OFFICE.

WILLIAM S. GRAHAM, OF CANTON, ILLINOIS, ASSIGNOR TO PARLIN & ORENDORFF COMPANY, OF CANTON, ILLINOIS, A CORPORATION OF ILLINOIS.

COTTON-SEED-DROPPING MECHANISM.

1,017,664.  Specification of Letters Patent.  Patented Feb. 20, 1912.

Application filed June 19, 1911. Serial No. 634,144.

*To all whom it may concern:*

Be it known that I, WILLIAM S. GRAHAM, a citizen of the United States, residing at Canton, in the county of Fulton and State of Illinois, have invented certain new and useful Improvements in Cotton-Seed-Dropping Mechanism, of which the following is a specification, reference being had to the accompanying drawings.

This invention relates to cotton seed dropping mechanism of the type employing a rotary seed-plate provided with a plurality of seed-cups or cells about its periphery each adapted to contain a single cotton seed, and it has for its object the provision of a new and improved construction whereby the seed may be dropped more uniformly than has been heretofore possible.

One of the specific objects of my invention is to provide a new and improved arrangement and construction of parts for insuring the filling of the seed-cells with the cotton seed, one seed in each cell, so as to procure accuracy of drop.

Another object is to provide new and improved means for ejecting the seed positively from the seed-cells without any danger of cracking or otherwise injuring the seed even though two or more seeds may be wedged into a single cell.

Another object is to improve the construction and arrangement of mechanisms of this type in sundry details hereinafter pointed out.

The means by which I have accomplished these results are illustrated in the drawings and hereinafter specifically described.

That which I believe to be new is set forth in the claims.

Figure 2:
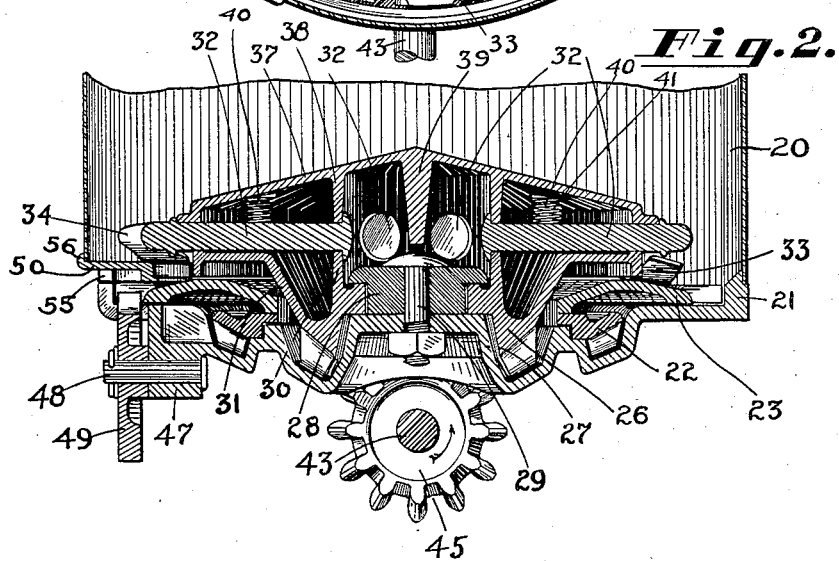

In the drawings,—Figure 1 is a top or plan view of my improved mechanism. Fig. 2 is a cross-section taken on line 2—2 of Fig. 1. Fig. 3 is a side view, taken from the left in Fig. 1, with the hopper removed. Fig. 4 is an enlarged detail, being a bottom plan view of the cut-off plate, showing in dotted lines the seed ejecting means in position relative to the cut-off plate, and showing also in dotted lines between the two parts a fragmentary portion of the seed-plate. Fig. 5 is a cross-section taken on line 5—5 of Fig. 4. Fig. 6 is an enlarged detail, showing one of the spring-seated shoes adapted to press the seeds into the seed-cells. Fig. 7 is an enlarged detail, showing one of the spring-seated shoes adapted to scrape the surplus seed from the seed-plate. Fig. 8 is an enlarged detail, being a bottom plan view of a portion of the seed-plate. Fig. 9 is an enlarged detail, being a bottom plan view of a portion of the gear-ring by which the seed-plate is rotated.

Referring to the several figures of the drawings, in which corresponding parts are indicated by the same reference characters, 20 indicates a seed-hopper having a base 21 by which it is adapted to be secured to a planter frame in any suitable manner. 22 indicates a gear ring revolubly mounted in an annular channel in said base 21. 23 indicates an annular seed-plate mounted on said gear ring and adapted to rotate therewith by reason of a lug 24 on said gear ring engaging with a suitable notch $24^a$ in said plate, as shown in Figs. 8 and 9. As shown in Figs. 1 and 8, the seed-plate is provided on its periphery with a plurality of seed-cells 25 each of a size adapted to hold a single cotton seed. As shown in Fig. 3, one side face of each cell is substantially straight at a slight angle from the vertical, while the other side face is substantially round so that the upper portion of each cell is considerably larger than the lower portion thereof. As shown in Figs. 1 and 2, the inner face of each cell is beveled, with the result that the seeds have a natural tendency to roll into position in the cells.

26 indicates a gear rotatably mounted upon a boss 27 rising from the bottom plate 21 and held in centered position thereon by a washer 28 and bolt 29. Rising from the gear 26 are two annular flanges 30 and 31, in the upper edges of which are mounted the shanks 32 of shoes 33 and 34, which extend substantially at right angles to said shanks.

35 indicates lugs extending from the shanks 32, provided with short pins 36.

37 indicates a cap-plate provided with a depending annular flange 38 and a depending central pin 39. The outer edge of said cap-plate and the lower edge of said flange 38 are properly recessed to receive and hold the shanks 32 in position in the flanges 30 and 31 of the gear 26. The lower face of the plate 37 is provided with short pins 40 depending therefrom opposite to the short pins 36 on the shanks 32 of the shoes 33—34.

41 indicates compression coiled springs mounted on the pins 36—40 between the shoes and the plate 37.

Screws 42 serve to secure the plate 37 in position upon the gear 26. The pin 39 serves to hold the bolt 29 in position in the washer 28 when the gear and its connected parts are removed from the bottom-plate 21.

43 indicates a shaft journaled in bearings 44 depending from the bottom-plate 21.

45 indicates a gear fixed on the shaft 43 and meshing with the gear 26 through a suitable opening (not shown) in the bottom-plate, and 46 indicates a gear fixed on said shaft and meshing with the gear-ring 22 through a suitable opening (not shown) in said bottom-plate 21. Thus when the shaft 43 is rotated, the gear ring and seed-plate are rotated in one direction, and the gear and shoes 33—34 are rotated in the opposite direction.

47 indicates a lug in which is mounted a spindle 48 upon which is journaled a toothed wheel 49, the teeth of which are adapted to engage the seed-cells 25 of the rotatable seed-plate.

50 indicates a cut-off plate secured to the bottom-plate 21 by means of lugs 51—52 which are bolted or otherwise suitably secured to corresponding lugs 53—54 on said bottom-plate. This cut-off plate is located immediately above the seed-plate and is provided upon its lower face with a flange 55 which prevents the seed from dropping out of the seed-cells 25 until a point is reached above the seed-tube (not shown but to be located immediately beneath the toothed ejector wheel 49). On its upper face about its outside periphery, the plate 50 is provided with a flange 56 within which the lower edge of the hopper is held at that part of the periphery of the hopper. Along the inner edge of this plate 50, there is on its under face a flange 57 which extends to within a very short distance from the seed-plate and serves ordinarily to scrape from the seed-cells 25 any surplus of seed contained therein,—that is to say, it serves ordinarily to scrape off all but the single seed of cotton desired for each cell.

The operation of my improved machine is as follows,—With the shaft 43 driven by any suitable means in the direction indicated by the arrow on said shaft in Fig. 3, the gear 46 drives the seed-plate in the direction indicated in Figs. 1 and 4 by the arrows thereon, and the gear 45 drives the gear 26 in the opposite direction as indicated by the arrow thereon in Fig. 1. With the hopper 20 filled with cotton seed, the rotation of the seed-plate and the rotation of the shoes 33—34 in the opposite direction directly over the seed-cells agitates the seed and tends to cause it to find its way into the seed-cells. The shoes 33 are yieldingly held in contact with the seed-plate as above described, and the heels of these shoes drop into each of the seed-cells as they pass each other, tending to press the seed thoroughly into the seed-cells. The shoes 34 are also yieldingly held in contact with the seed-plate as above described, and these shoes tend to scrape off the surplus seed from each cell as they pass each other. Inasmuch as each cell is exposed to the seed for the greater portion of its entire rotation, the likelihood that any cell will pass under the cut-off plate 50 without a seed in it is exceedingly small. Moreover, with cotton-seed of substantially uniform size and with a seed-plate suited to the seed being planted, a very small proportion of the seed-cells receive and deliver more than a single seed at a time.

Referring now to the plate 50 shown in Figs. 3 and 4, 58 indicates a substantially square shoulder thereon positioned diagonally across the circular path of the seed-cells directly above the same and above the ejector wheel 49. As the seed-cells are rotated, the ejector wheel 49 also is rotated, one of the teeth of such wheel being engaged by each one of the seed-cells, one of such teeth entering from below each succeeding cell 25 and forcing upward the seed or seeds contained therein. This action brings the seeds into contact with the diagonally-disposed shoulder 58, which serves to brush the seed off of the plate into any suitable seed-tube not shown. In case two or more seeds become wedged in a cell 25, the ejector-wheel 49 invariably loosens the seeds, and this is accomplished without cracking or otherwise injuring the seeds which are forced easily out of the cell by the way by which they entered it.

While I have shown the shoulder 58 as being formed on the cut-off plate 50, it will be understood that I do not limit myself to this construction, since an entirely separate plate might manifestly be used if desired.

That which I claim as my invention, and desire to secure by Letters Patent, is—

1. In a seed-dropping mechanism, the combination of a seed-plate provided with a plurality of seed-cells, means for rotating said seed-plate, and a toothed wheel rotatably mounted below said seed-plate, the teeth of said wheel being adapted to extend upward through said seed-cells.

2. In a seed-dropping mechanism, the combination of a seed-plate provided with a plurality of seed-cells, means for rotating said seed-plate, a toothed wheel rotatably mounted below said seed-plate, the teeth of said wheel being adapted to extend upward through said seed-cells to eject seed therefrom, and means coöperating with said toothed wheel for scraping seed from said seed-plate.

3. In a seed-dropping mechanism, the combination of a seed-plate provided with a plurality of seed-cells, means for rotating said seed-plate, a toothed wheel rotatably mounted below said seed-plate, the teeth of said wheel being adapted to extend upward through said seed-cells to eject seed therefrom, and a diagonally-disposed plate located above said toothed wheel immediately next to said seed plate.

4. In a seed-dropping mechanism, the combination of a seed-plate provided with a plurality of seed-cells, means for rotating said seed-plate, a toothed wheel rotatably mounted below said seed-plate, the teeth of said wheel being adapted to extend upward through said seed-cells to eject all of the seed from said cells successively, and a plate located immediately above said seed-plate extending diagonally across the seed-cells therein and adapted to scrape the seed over the edge of the seed-plate by the rotation of the seed-plate when the seed is raised from the cell by the toothed wheel.

5. In a seed-dropping mechanism, the combination of a seed-plate provided with a plurality of seed-cells each of which is wider at its top than at the bottom, means for rotating said seed-plate, and means for forcing all of the seed upward from said seed-cells successively and delivering said seed over the edge of the plate.

6. In a seed-dropping mechanism, the combination of a seed-plate provided with a plurality of seed-cells each of which is wider at its top than at the bottom, means for rotating said seed-plate, means for forcing seed upward from said seed-cells, and means for scraping said seed from said seed-plate as the same is rotated while the seed is held in raised position.

7. In a seed-dropping mechanism, the combination of a rotary seed-plate provided with a plurality of seed-cells, means for rotating said seed-plate, spring-seated shoes adapted to be yieldingly depressed into each seed-cell to press seed thereinto, and other spring-seated shoes adapted to act as cut-offs to scrape the surplus seed from the seed-plate.

8. In a seed-dropping mechanism, the combination of a rotary seed-plate provided with a plurality of seed-cells, means for rotating said seed-plate, means for pressing seed into said seed-cells, said means comprising a shank, a shoe extending from said shank in the direction opposite to that in which the seed-plate is rotated, and a spring tending to hold said shoe against said seed-plate, and means for rotating said shoe in the direction in which it extends from said shank.

9. In a seed-dropping mechanism, the combination of a rotary seed-plate provided with a plurality of seed-cells, means for rotating said seed-plate, a gear mounted concentrically relative to said seed-plate, a cap-plate secured upon said gear, a plurality of seed-stirring devices—each comprising a shank revolubly mounted between said gear and said cap-plate, a shoe extending from said shank in the direction opposite to that in which the seed-plate is rotated, a lug extending from said shank in the same direction as does said shoe, and a pin on said lug,—a pin depending from said cap in line with each of said first-mentioned pins, springs interposed between each of said two oppositely-disposed pins, and means for rotating said gear in the direction in which said shoes extend from said shanks.

10. In a seed-dropping mechanism, the combination of a rotary seed-plate provided with a plurality of seed-cells, means for rotating said seed-plate, spring-seated shoes adapted to press seed into said seed-cells, other spring-seated shoes adapted to act as cut-offs to scrape the surplus seed from the seed-plate, and means for rotating said shoes in the opposite direction to that in which the seed plate is rotated.

WILLIAM S. GRAHAM.

Witnesses:
W. M. CAVES,
ROY MALMGREN.

Copies of this patent may be obtained for five cents each, by addressing the "Commissioner of Patents, Washington, D. C."